Patented Dec. 7, 1937

2,101,096

UNITED STATES PATENT OFFICE 2,101,096

PRODUCTION OF MERCAPTANS

Raymond Reuter, Upper Aetna Lake, Medford Lakes, N. J., and Frank L. Gaus, Philadelphia, Pa., assignors to The Atlantic Refining Company, Philadelphia, Pa., a corporation of Pennsylvania No Drawing. Application February 15, 1935, Serial No. 6,652

8 Claims. (Cl. 260—156)

The present invention relates to the production of organic sulfur-containing compounds and relates more particularly to the production of mercaptans from unsaturated hydrocarbons and hydrogen sulfide.

An object of this invention is the production of mercaptans containing a lesser number of carbon atoms to the molecule than are contained in the hydrocarbons employed as the starting material. A further object of this invention is the production of such mercaptans in a highly pure state, and in such a manner that the initial hydrocarbon material is not wastefully decomposed or reacted with hydrogen sulfide or other materials to produce a variety of undesirable products.

Heretofore it has been proposed to prepare mercaptans from unsaturated hydrocarbons and hydrogen sulfide by reacting the same in the presence of a catalyst such as fuller's earth, silica gel, charcoal or sulfuric acid. The products obtained by such reaction were generally mixtures containing mercaptans having a carbon atom content corresponding to that of the unsaturated hydrocarbon starting materials, and such mercaptan mixtures could only be separated into individual compounds by difficult and expensive procedures.

We have found that mercaptans, in a highly pure state, may be produced by the action of hydrogen sulfide upon hydrocarbons and particularly unsaturated hydrocarbon polymers, under suitable conditions of temperature and pressure, and in the presence of a catalyst, in such a manner that the resulting mercaptans will contain a lesser number of carbon atoms to the molecule than the hydrocarbons employed as starting materials, and will be readily separable, one from another, and from the various reaction products.

In accordance with our invention, unsaturated hydrocarbon polymers and hydrogen sulfide or gases containing the same, are brought into contact with a catalyst at temperatures of the order of from about 100° C. to about 300° C., and preferably from about 150° C. to 250° C., and under pressures ranging from about atmospheric to about 3000 lbs./sq. in., and preferably under pressures of the order of from about 500 lbs./sq. in. to about 1500 lbs./sq. in. The time of reaction between the unsaturated polymers and the hydrogen sulfide, in the presence of a catalyst will depend upon the character of the unsaturated polymers, the type of catalyst, and the temperatures and pressures employed. Reaction times of the order of from 1 to 15 minutes are suitable when the reaction is carried on in a continuous system, whereas reaction times of the order of from 15 minutes to 3 or 4 hours may be employed in a batch or static system.

The unsaturated hydrocarbon polymers which may be utilized in accordance with our invention are preferably those which are readily depolymerized into lower molecular weight unsaturated hydrocarbons or unsaturated hydrocarbon polymers, i. e., the polymers of propylene, butylene, amylene and the like. Tri-isobutylene, for example, is particularly suitable as a starting material for the production of tertiary butyl mercaptan, in accordance with our process. The various unsaturated hydrocarbon polymers may be obtained from the liquid or gaseous products resulting from the refining of petroleum or other hydrocarbons, and particularly from the gases produced in the cracking of hydrocarbons. Normally gaseous hydrocarbons, for example, the various butylenes, may be selectively polymerized with a catalyst such as sulfuric acid to produce tri-isobutylene, a polymer which is readily separable, in a relatively pure state, from the remaining butylenes by distillation.

We have found that in our process for producing relatively pure mercaptans, we may employ a number of catalytic substances, among which may be mentioned fuller's earth, clay, activated clay, floradin, bentonite, silica gel, activated carbon and the like, as well as the sulfides of cadmium, nickel, cobalt, zinc, iron, molybdenum and tungsten or mixtures of the same. The phosphoric acids, and particularly meta-phosphoric acid may likewise be employed as a catalyst in our process. When meta-phosphoric acid and carbon, or nickel sulfide supported on clay, are utilized as a catalyst, we prefer to carry on our process at temperatures of the order of from about 150° C. to about 250° C., whereas the sulfides of cadmium, molybdenum and tungsten are suitably employed at a temperature of the order of about 300° C.

In order to better illustrate our process, the following example is presented:

Tri-isobutylene, having a boiling point of about 172° C. and a specific gravity of 0.76 at 15° C., and hydrogen sulfide, in the mol. ratio of about 1 to 3, were caused to react, in the presence of a clay catalyst, at a temperature of about 200° C., and under a pressure of about 700 lbs./sq. in., for a period of about 4 hours. The clay catalyst employed was an Attapulgus clay of 15 to 22 mesh which had been heat treated at about 540° C. for 40 minutes. The reaction products were cooled to about 20° C., freed of hydrogen sulfide and then fractionally distilled. A yield of about 46% by volume of tertiary butyl mercaptan, having a boiling point of from 64° C. to 65° C., a specific gravity of 0.80 at 15° C. and a refractive index of 1.4228 at 20° C., was obtained. The remaining reaction products comprised a mixture of sulfur compounds and hydrocarbon polymers, among which may be mentioned tri-isobutylene, di-isobutyl mercaptan and other compounds of higher and lower molecular weight.

It will be seen, from the above example, that in accordance with our process, we are able to obtain a relatively high yield of a mercaptan having a lesser number of carbon atoms to the molecule than the initial unsaturated hydrocarbon employed, and that such mercaptan is readily separated and recovered from the reaction products in a high degree of purity. Our process may be carried on in systems designed for either batch operation or continuous operation, the latter being preferable from the standpoint of increased efficiency and yield.

While we have illustrated our process with reference to the production of tertiary butyl mercaptan, we do not intend to limit ourselves thereto, but contemplate as within the scope of our invention, the production of various other mercaptans from different unsaturated hydrocarbon polymers amendable to depolymerization.

What we claim is:

1. A process for producing mercaptans having a lesser number of carbon atoms to the molecule than the olefine hydrocarbons from which they are produced, which comprises reacting a branched chain olefine hydrocarbon polymer with hydrogen sulfide at a temperature of from about 100° C. to about 300° C., and under superatmospheric pressure, in the presence of a catalyst for promoting depolymerization of the olefine hydrocarbon polymer and reaction thereof with hydrogen sulfide.

2. A process for producing mercaptans having a lesser number of carbon atoms to the molecule than the olefine hydrocarbons from which they are produced, which comprises reacting a branched chain olefine hydrocarbon polymer with hydrogen sulfide at a temperature of from about 100° C. to about 300° C., and under a pressure of from about 500 to about 1500 lbs./sq. in., in the presence of a catalyst for promoting depolymerization of the olefine hydrocarbon polymer and reaction thereof with hydrogen sulfide.

3. A process for producing mercaptans having a lesser number of carbon atoms to the molecule than the olefine hydrocarbons from which they are produced, which comprises reacting a branched chain olefine hydrocarbon polymer with hydrogen sulfide at a temperature of from about 100° C. to about 300° C., and under superatmospheric pressure, in the presence of an argillaceous catalyst.

4. A process for producing mercaptans having a lesser number of carbon atoms to the molecule than the olefine hydrocarbons from which they are produced, which comprises reacting a branched chain olefine hydrocarbon polymer with hydrogen sulfide at a temperature of from about 100° C. to about 300° C., and under a pressure of from about 500 to about 1500 lbs./sq. in., in the presence of an argillaceous catalyst.

5. A process for producing tertiary butyl mercaptan, which comprises reacting tri-isobutylene with hydrogen sulfide at a temperature of from about 100° C. to about 300° C., and under superatmospheric pressure, in the presence of a catalyst for promoting depolymerization of tri-isobutylene and reaction thereof with hydrogen sulfide.

6. A process for producing tertiary butyl mercaptan, which comprises reacting tri-isobutylene with hydrogen sulfide at a temperature of from about 150° C. to about 250° C., and under superatmospheric pressure, in the presence of a catalyst for promoting depolymerization of tri-isobutylene and reaction thereof with hydrogen sulfide.

7. A process for producing tertiary butyl mercaptan, which comprises reacting tri-isobutylene with hydrogen sulfide at a temperature of from about 150° C. to about 250° C., and under a pressure of from about 500 to about 1500 lbs./sq. in., in the presence of a catalyst for promoting depolymerization of tri-isobutylene and reaction thereof with hydrogen sulfide.

8. A process for producing tertiary butyl mercaptan, which comprises reacting tri-isobutylene with hydrogen sulfide at a temperature of about 200° C., and under a pressure of from about 500 to about 1500 lbs./sq. in., in the presence of an argillaceous catalyst.

RAYMOND REUTER.
FRANK L. GAUS.